US012649571B2

(12) United States Patent　(10) Patent No.: US 12,649,571 B2
Pfaller et al.　(45) Date of Patent: Jun. 9, 2026

(54) ROTORCRAFT WITH A TAIL BOOM AND AN INTEGRAL STABILIZER ARRANGEMENT

(71) Applicant: AIRBUS HELICOPTERS DEUTSCHLAND GMBH, Donauworth (DE)

(72) Inventors: Rupert Pfaller, Riemerling (DE); Tobias Ries, Nordendorf (DE)

(73) Assignee: AIRBUS HELICOPTERS DEUTSCHLAND GmbH, Donauworth (DE)

( * ) Notice: Subject to any disclaimer, the term of this patent is extended or adjusted under 35 U.S.C. 154(b) by 0 days.

(21) Appl. No.: 18/222,547

(22) Filed: Jul. 17, 2023

(65) Prior Publication Data

US 2024/0174354 A1　May 30, 2024

(30) Foreign Application Priority Data

Oct. 28, 2022　(EP) ..................................... 22204454

(51) Int. Cl.
B64C 27/82　(2006.01)

(52) U.S. Cl.
CPC ...... B64C 27/82 (2013.01); B64C 2027/8254 (2013.01); B64C 2027/8272 (2013.01); B64C 2027/8281 (2013.01)

(58) Field of Classification Search
CPC .................. B64C 27/82; B64C 27/006; B64C 2027/8281; B64C 2027/8272;
(Continued)

(56) References Cited

U.S. PATENT DOCUMENTS 3,902,688 A * 9/1975 Seibel ..................... B64C 27/82
244/17.11
4,506,849 A * 3/1985 Lemont ................... B64C 27/82
244/17.11
(Continued)

FOREIGN PATENT DOCUMENTS

EP　0254605 A1　1/1988
EP　2409917 A1　1/2012
(Continued)

OTHER PUBLICATIONS

European Search Report for European Application No. EP 22204454.7, Completed by the European Patent Office, Dated Apr. 19, 2023, 5 pages.

*Primary Examiner* — Richard Green
(74) *Attorney, Agent, or Firm* — Brooks Kushman P.C.

(57) ABSTRACT

A rotorcraft with at least one main rotor and a fuselage, comprising: a tail boom connected to the fuselage, the tail boom extending in a longitudinal direction from the fuselage toward a duct-type portion; a shroud provided at the duct-type portion and forming a transverse duct comprising an air inlet region and an air outlet region; the transverse duct having a longitudinal extension; at least one ducted tail rotor rotatably arranged in the transverse duct; and an integral stabilizer arrangement mounted to the shroud, the integral stabilizer arrangement being embodied in box configuration and arranged laterally on a side of the shroud on which the air inlet region of the transverse duct is arranged.

20 Claims, 5 Drawing Sheets

(58) Field of Classification Search
CPC .... B64C 2027/8263; B64C 2027/8254; B64C
2027/8245; B64U 30/299
See application file for complete search history.

(56) References Cited

U.S. PATENT DOCUMENTS

| | | | |
|---|---|---|---|
| 4,809,931 A | | 3/1989 | Mouille et al. |
| 8,985,500 B2 * | | 3/2015 | Borie ...................... B64C 27/82 |
| | | | 244/45 R |
| 9,381,995 B2 * | | 7/2016 | Mores ..................... B64C 27/82 |
| 9,475,578 B2 * | | 10/2016 | Mores ..................... B64C 27/82 |
| 10,814,971 B2 * | | 10/2020 | Hampton ................ B64C 27/82 |
| 2012/0018570 A1 | | 1/2012 | Borie et al. |
| 2014/0084105 A1 | | 3/2014 | Eglin |
| 2021/0276703 A1 | | 9/2021 | Ross et al. |
| 2023/0022308 A1 * | | 1/2023 | Medici .................... B64C 27/82 |
| 2024/0034465 A1 * | | 2/2024 | Ivans ...................... B64C 27/82 |

FOREIGN PATENT DOCUMENTS

| | | | |
|---|---|---|---|
| EP | 2666719 A1 | 11/2013 |
| EP | 2878536 A1 | 6/2015 |
| EP | 2883791 A1 | 6/2015 |
| EP | 3424818 A1 | 1/2019 |
| EP | 3730403 A1 | 10/2020 |

* cited by examiner

ROTORCRAFT WITH A TAIL BOOM AND AN INTEGRAL STABILIZER ARRANGEMENT

CROSS-REFERENCE TO RELATED APPLICATIONS

This application claims priority to European patent application No. EP 22204454.7 filed on Oct. 28, 2022, the disclosure of which is incorporated in its entirety by reference herein.

TECHNICAL FIELD

The present disclosure is related to a rotorcraft with at least one main rotor and a fuselage, comprising a tail boom connected to the fuselage, the tail boom extending in a longitudinal direction from the fuselage toward a duct-type portion, a shroud provided at the duct-type portion and forming a transverse duct comprising an air inlet region and an air outlet region, the transverse duct comprising a circumferential direction and a longitudinal extension oriented at least essentially perpendicular to the circumferential direction and at least essentially perpendicular to the longitudinal direction of the tail boom, and at least one ducted tail rotor rotatably arranged in the transverse duct.

BACKGROUND

The documents EP 2 883 791 A1, EP 3 730 403 A1, and EP 3 424 818 A1 respectively describe a rotorcraft with a main rotor and a counter-torque rotor that is positioned at a tail boom of the rotorcraft. The counter-torque rotor is provided for counteracting main rotor torque created by the main rotor on a respective airframe of the rotorcraft. More specifically, the counter-torque rotor is rotatably arranged within a transverse duct located at a duct-type portion of the tail boom and, thus, embodied as a ducted tail rotor in the form of a Fenestron® tail rotor. The duct-type portion is provided with a shroud that defines the transverse duct such that the transverse duct has a constant depth over its circumference, and is further provided for generation of counter-torque thrust with a bumper and a vertical fin that is provided with an associated tail wing in a so-called T-tail configuration. The vertical fin and the bumper form a vertical stabilizer for stabilizing the rotorcraft in yaw, and the tail wing forms a horizontal stabilizer for stabilizing the rotorcraft in pitch.

Provision of a rotorcraft with a vertical fin equipped with a tail wing in T-tail configuration is advantageous in that the tail wing that forms a horizontal stabilizer is positioned away from a respective main rotor downwash of the rotorcraft's main rotor in most flight conditions. Accordingly, the main rotor downwash may not cause a downward force on the tail wing so that a negative influence to trim and handling is avoided. Furthermore, a certain blockage of the main rotor downwash on the tail wing, which may cause an efficiency loss, is also avoided. However, a major disadvantage of such a T-tail configuration is the sensibility of the tail wing to gusts and vibrations due to the comparatively low stiffness of such a T-tail configuration.

The document EP 2 878 536 A1, in turn, describes a rotorcraft with a main rotor and a counter-torque rotor that is positioned at a tail boom of the rotorcraft. The counter-torque rotor is provided for counteracting main rotor torque created by the main rotor on a respective airframe of the rotorcraft. More specifically, the counter-torque rotor is rotatably arranged within a transverse duct located at a duct-type portion of the tail boom and, thus, embodied as a ducted tail rotor in the form of a Fenestron® tail rotor. The duct-type portion is provided with a shroud that defines the transverse duct such that the transverse duct has a constant depth over its circumference, and is further provided for generation of counter-torque thrust with a bumper and a vertical fin, which form a vertical stabilizer for stabilizing the rotorcraft in yaw. Furthermore, a horizontal stabilizer is provided in the form of a so-called double-decker configuration with superposed wings on each side of the tail boom, which are spaced apart from the duct-type portion and provided for stabilizing the rotorcraft in pitch.

The main advantages of such a double-decker configuration consist in a reduced area that is influenced by the rotorcraft's main rotor downwash and a comparatively slightly higher stiffness of the double-decker configuration compared to the T-tail configuration. However, due to the comparatively small height of the tail boom, the respectively superposed wings in the double-decker configuration are not sufficiently spaced apart from each other, resulting in a negative influence to a respective aerodynamic efficiency of the double-decker configuration because of the mutually influenced circulation of one of the superposed wings on top of the other.

Rotorcrafts with other stabilizer arrangements for stabilizing the rotorcrafts in yaw and/or pitch are also described e.g., in the documents EP 0 254 605 A1, EP 2 666 719 A1, EP 2 409 917 A1, and US 2021/0276703 A1.

SUMMARY

It is an object of the present disclosure to provide a new rotorcraft having an improved stabilizer arrangement for stabilizing the rotorcraft in yaw and/or pitch.

More specifically, according to the disclosure a rotorcraft with at least one main rotor and a fuselage is provided, comprising a tail boom connected to the fuselage. The tail boom extends in a longitudinal direction from the fuselage toward a duct-type portion. A shroud is provided at the duct-type portion and forms a transverse duct comprising an air inlet region and an air outlet region. The transverse duct comprises a circumferential direction and a longitudinal extension oriented at least essentially perpendicular to the circumferential direction and at least essentially perpendicular to the longitudinal direction of the tail boom. At least one ducted tail rotor is rotatably arranged in the transverse duct. An integral stabilizer arrangement is mounted to the shroud. The integral stabilizer arrangement is embodied in box configuration and arranged laterally on a side of the shroud on which the air inlet region of the transverse duct is arranged.

The integral stabilizer arrangement of the inventive rotorcraft is preferably mainly composed of a comparatively high and long one-sided upper horizontal stabilizer, a comparatively low and short one-side lower horizontal stabilizer, and a strut, each having an associated aerodynamic profile. More specifically, respective inner ends of the one-sided upper and lower horizontal stabilizers are preferably connected to the duct-type portion, which comprises a vertical stabilizer that forms a first vertical profile, whereas one end of the aerodynamically profiled strut, which forms a second vertical profile, is preferably connected to an outer end of the one-sided upper horizontal stabilizer, and whereas its other end is preferably connected to an outer end of the one-sided lower horizontal stabilizer, thus, forming the box configuration. All corners of the one-sided upper and lower horizontal stabilizers may be rounded for less interference drag.

Furthermore, due to the first and second vertical profiles, i.e., the vertical stabilizer and the aerodynamically profiled strut, a respective aerodynamic efficiency of the integral stabilizer arrangement may be increased with an effect similar to the action of winglets. Thus, an effective span of the one-sided upper and lower horizontal stabilizers is increased and an induced drag is reduced.

Advantageously, the integral stabilizer arrangement is located such that it is not at all, or at least not significantly, influenced by the downwash of the at least one main rotor of the rotorcraft. For instance, in order to avoid blockage of an airflow to the at least one ducted tail rotor, the strut of the integral stabilizer arrangement is preferably mainly located behind the transverse duct of the shroud.

More specifically, preferably only a comparatively small area of the integral stabilizer arrangement is concerned by the main rotor downwash as the greatest part of the upper horizontal stabilizer is positioned in a comparatively high position and/or the lower horizontal stabilizer is covered by respectively higher positioned components of the upper horizontal stabilizer. Preferably, respective lower components of the integral stabilizer arrangement are positioned more aft than the higher components.

Furthermore, the integral stabilizer arrangement is comparatively stiff due to the box configuration, as the one-sided upper horizontal stabilizer is connected at both ends with the rotorcraft structure, i.e., its inner end is connected to an upper end of the vertical stabilizer provided at the duct-type portion, whereas its outer end is connected to the rotorcraft structure via the aerodynamically profiled strut and the one-sided lower horizontal stabilizer. The aerodynamically profiled strut is preferably inclined relative to a height axis of the rotorcraft and fulfills partially the task of a horizontal stabilizer, as it sticks stable in forward flight condition of the rotorcraft. Moreover, it advantageously supports the vertical stabilizer for flight stability. Additionally, more counter-torque thrust is generated to counter act the main rotor torque in forward flight condition.

More generally, the function of a horizontal stabilizer is the generation of downward thrust, whereas the function of a vertical stabilizer is the generation of counter-torque or sideward thrust. Therefore, the aerodynamic profile of the aerodynamically profiled strut may be optimized for both functions at the same time.

According to a preferred embodiment, the integral stabilizer arrangement comprises a vertical stabilizer mounted to the shroud for providing at least stability of the rotorcraft in yaw.

According to a further preferred embodiment, the vertical stabilizer comprises an aerodynamic profile.

According to a further preferred embodiment, the integral stabilizer arrangement comprises a horizontal stabilizer mounted to the vertical stabilizer for providing at least stability of the rotorcraft in pitch, the horizontal stabilizer extending from the vertical stabilizer on the side of the shroud on which the air inlet region of the transverse duct is arranged.

According to a further preferred embodiment, the horizontal stabilizer is mounted to the vertical stabilizer via a first rounded connecting portion.

According to a further preferred embodiment, the horizontal stabilizer comprises an aerodynamic profile.

According to a further preferred embodiment, the integral stabilizer arrangement comprises a profiled connecting strut connecting the horizontal stabilizer to the shroud, the profiled connecting strut being arranged on the side of the shroud on which the air inlet region of the transverse duct is arranged.

According to a further preferred embodiment, the profiled connecting strut is mounted to the horizontal stabilizer via a second rounded connecting portion.

According to a further preferred embodiment, the profiled connecting strut comprises an aerodynamic profile.

According to a further preferred embodiment, the integral stabilizer arrangement comprises another horizontal stabilizer mounted to the shroud for providing at least stability of the rotorcraft in pitch, the other horizontal stabilizer extending from the shroud on the side of the shroud on which the air inlet region of the transverse duct is arranged.

According to a further preferred embodiment, the other horizontal stabilizer is mounted to the profiled connecting strut via a third rounded connecting portion.

According to a further preferred embodiment, the horizontal stabilizer extends farther away from the shroud than the other horizontal stabilizer on the side of the shroud on which the air inlet region of the transverse duct is arranged.

According to a further preferred embodiment, the second rounded connecting portion and the third rounded connecting portion are spaced apart from each other in the longitudinal direction of the tail boom such that the profiled connecting strut is arranged at least approximately tangentially to the transverse duct.

According to a further preferred embodiment, the vertical stabilizer is mounted on top of the shroud and embodied as a tail fin.

According to a further preferred embodiment, the transverse duct comprises a depth oriented at least essentially in parallel to the longitudinal extension of the transverse duct, wherein the depth varies along the circumferential direction of the transverse duct.

Advantageously, the inventive rotorcraft is equipped with an efficiently designed shroud provided at a duct-type portion of the tail boom to reduce aerodynamic drag of the shroud in forward flight condition of the rotorcraft. More specifically, the shroud may have an improved aerodynamic efficiency that is mainly due to an improved aerodynamic design in regions of the shroud which are located in axial prolongation of the tail boom between the tail boom and the transverse duct of the shroud as well as between the transverse duct and a trailing edge of the shroud. This improved aerodynamic design enables reduction of aerodynamic drag occurring in the forward flight condition of the rotorcraft at the transverse duct by means of a reduction of respective suction and compression effects occurring in the forward flight condition at the transverse duct.

Preferably, the improved aerodynamic design mainly consists in provision of aerodynamically improved vertical forward and vertical rearward middle sections of the transverse duct, which are respectively shaped like aerodynamic profiles. In addition, the trailing edge of the shroud at the position of the vertical rearward middle section may have a sharp edge similar to any aerodynamic profile. Moreover, the respective aerodynamic profiles in the vertical forward and vertical rearward middle sections may have a curved chord line for maximum sideward lift in forward flight condition of the rotorcraft, i.e., for maximum generation of counter-torque thrust in forward flight condition.

Advantageously, by shaping the vertical forward and vertical rearward middle sections of the shroud like aerodynamic profiles, the aerodynamic drag of the shroud in fast forward flight condition of the rotorcraft may be reduced significantly. However, in hover flight condition of the rotorcraft the counter-torque thrust generated by the duct-type portion with the ducted tail rotor and the shroud remains essentially similar to the counter-torque thrust that may be generated by means of a conventionally shaped shroud, whereas the generated counter-torque thrust may be increased in the fast forward flight condition of the rotorcraft.

BRIEF DESCRIPTION OF THE DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description.

DETAILED DESCRIPTION

Figure 1:
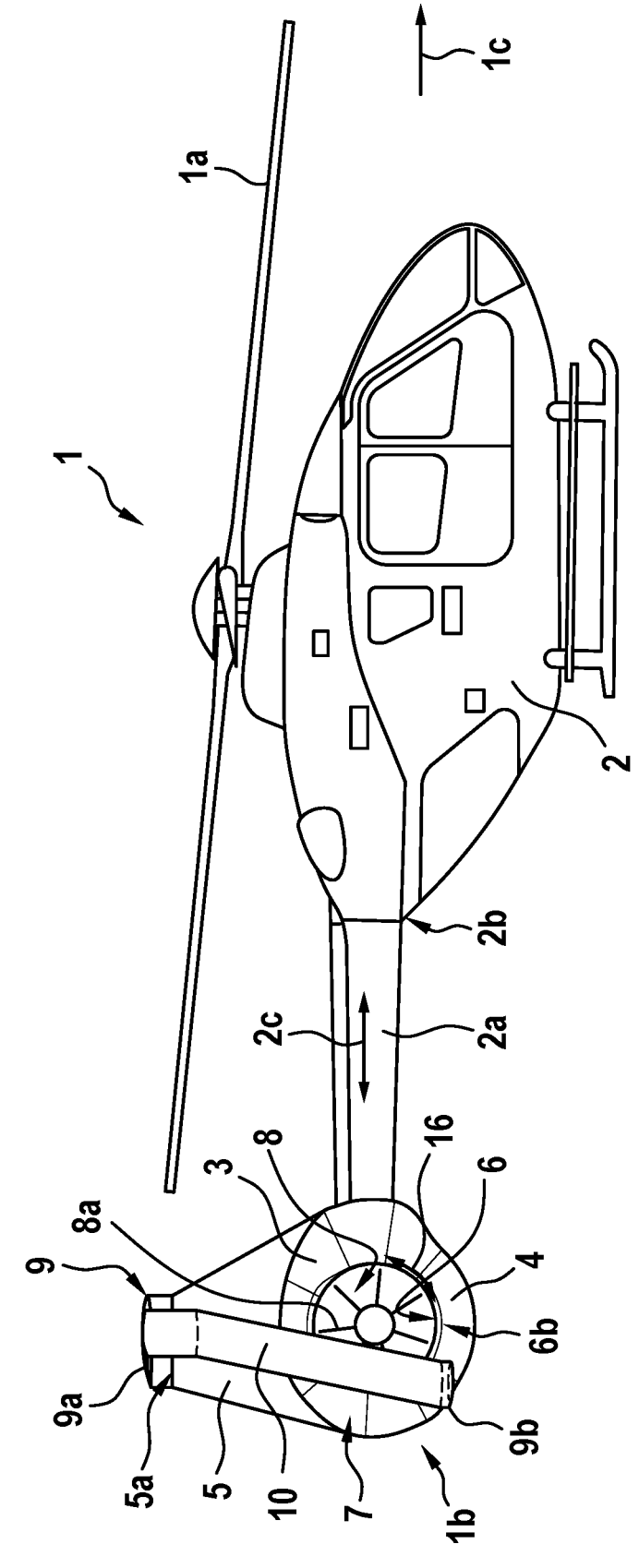
FIG. 1 shows a side view of a rotorcraft comprising a tail boom extending toward a duct-type tail portion having a shroud with an integral stabilizer arrangement according to the disclosure.

FIG. 1 shows a rotorcraft 1 with a fuselage 2 and a tail boom 2a that is connected to the fuselage 2 at a rear fuselage 2b. The tail boom 2a extends in its longitudinal direction 2c from the fuselage 2 and, more particularly, from the rear fuselage 2b toward at least one duct-type tail portion 7, which is referred to hereinafter as "the duct-type portion 7", for simplicity and brevity.

The rotorcraft 1 is preferably embodied as a helicopter and, therefore, also referred to hereinafter as "the helicopter 1", for simplicity and brevity. By way of example, the helicopter 1 is shown in forward flight condition in a forward flight direction 1c.

The helicopter 1 comprises at least one main rotor 1a configured to provide lift and/or forward thrust during operation, and at least one counter-torque device 8 configured to provide counter-torque during operation, i.e., to counter the torque created by rotation of the at least one main rotor 1a for purposes of balancing the helicopter 1 in terms of yaw. It should, however, be noted that the present disclosure is not limited to helicopters and may likewise be applied to other aircrafts that are equipped with rotary wings and at least one counter-torque device similar to the helicopter 1.

The at least one counter-torque device 8 preferably comprises the duct-type portion 7 and is illustratively provided at an aft section 1b of the helicopter 1. The at least one counter-torque device 8 may further comprise a bumper 4.

In other words, the duct-type portion 7 is arranged at a rear end of the tail boom 2a and a shroud 3 is provided at the duct-type portion 7. The shroud 3 forms a transverse duct 6 which illustratively comprises an air inlet region 6b and an air outlet region (6c in FIG. 2). The transverse duct 6 has a circumferential direction 16 and preferably at least one counter-torque rotor 8a is rotatably arranged in the transverse duct 6. Illustratively, the counter-torque rotor 8a forms a so-called Fenestron® tail rotor. Accordingly, for simplicity and clarity, the counter-torque rotor 8a is hereinafter also referred to as "the ducted tail rotor 8a".

According to the present disclosure, an integral stabilizer arrangement 5, 9, 10 is mounted to the shroud 3. More specifically, the integral stabilizer arrangement 5, 9, 10 is embodied in box configuration and arranged laterally on a side of the shroud 3 on which the air inlet region 6b of the transverse duct 6 is arranged.

It should be noted that the integral stabilizer arrangement 5, 9, 10 is only illustratively embodied on the side of the shroud 3 on which the air inlet region 6b of the transverse duct 6 is arranged, and not for restricting the present disclosure thereto. Instead, the integral stabilizer arrangement 5, 9, 10 may likewise be embodied on the side of the shroud 3 on which the air outlet region (6c in FIG. 2) of the transverse duct 6 is arranged. However, in both cases the integral stabilizer arrangement 5, 9, 10 is preferably embodied as a one-sided stabilizer arrangement, i.e., a stabilizer arrangement that extends at least essentially laterally on a single side of the shroud 3.

Illustratively, the integral stabilizer arrangement 5, 9, 10 comprises a vertical stabilizer 5 mounted to the shroud 3 for providing at least stability of the helicopter 1 in yaw. Preferably, the helicopter 1 comprises at least two horizontal stabilizers 9. Illustratively, the integral stabilizer arrangement 5, 9, 10 comprises an—in FIG. 1 upper—horizontal stabilizer 9a mounted to the vertical stabilizer 5 for providing at least stability of the helicopter 1 in pitch. For simplicity and clarity, the horizontal stabilizer 9a is hereinafter referred to as "the upper horizontal stabilizer 9a".

Preferably, the upper horizontal stabilizer 9a extends from the vertical stabilizer 5 on the side of the shroud 3 on which the air inlet region 6b of the transverse duct 6 is arranged. Illustratively, the upper horizontal stabilizer 9a is connected to an—in FIG. 1 upper—end 5a of the vertical stabilizer 5.

By way of example, the vertical stabilizer 5 is mounted on top of the shroud 3 and embodied as a tail fin. However, it should be noted that the present disclosure as described herein can be used with any helicopter and, more generally, any rotorcraft having a duct-type portion with a shroud, independent on whether this duct-type portion has a vertical stabilizer embodied as a fin or an otherwise configured vertical stabilizer. The present disclosure may even be used with any rotorcraft that comprises only a non-ducted tail rotor and a vertical stabilizer embodied as a fin or an otherwise configured vertical stabilizer. Furthermore, the vertical stabilizer 5 may optionally be provided with a rudder that may be adapted to provide for enhanced directional control of the helicopter 1, e.g., by being deflected to large angles to reduce a given lateral drag of the vertical stabilizer 5 in sideward flight.

Illustratively, the integral stabilizer arrangement 5, 9, 10 further comprises a profiled connecting strut 10 connecting the upper horizontal stabilizer 9a to the shroud 3. The profiled connecting strut 10 is preferably also arranged on the side of the shroud 3 on which the air inlet region 6b of the transverse duct 6 is arranged.

Illustratively, the integral stabilizer arrangement 5, 9, 10 further comprises another—in FIG. 1 lower—horizontal stabilizer 9b mounted to the shroud 3 for providing at least stability of the helicopter 1 in pitch. For simplicity and clarity, the horizontal stabilizer 9b is hereinafter referred to as "the lower horizontal stabilizer 9b". The lower horizontal stabilizer 9b preferably also extends from the shroud 3 on the side of the shroud 3 on which the air inlet region 6b of the transverse duct 6 is arranged.

Figure 2:
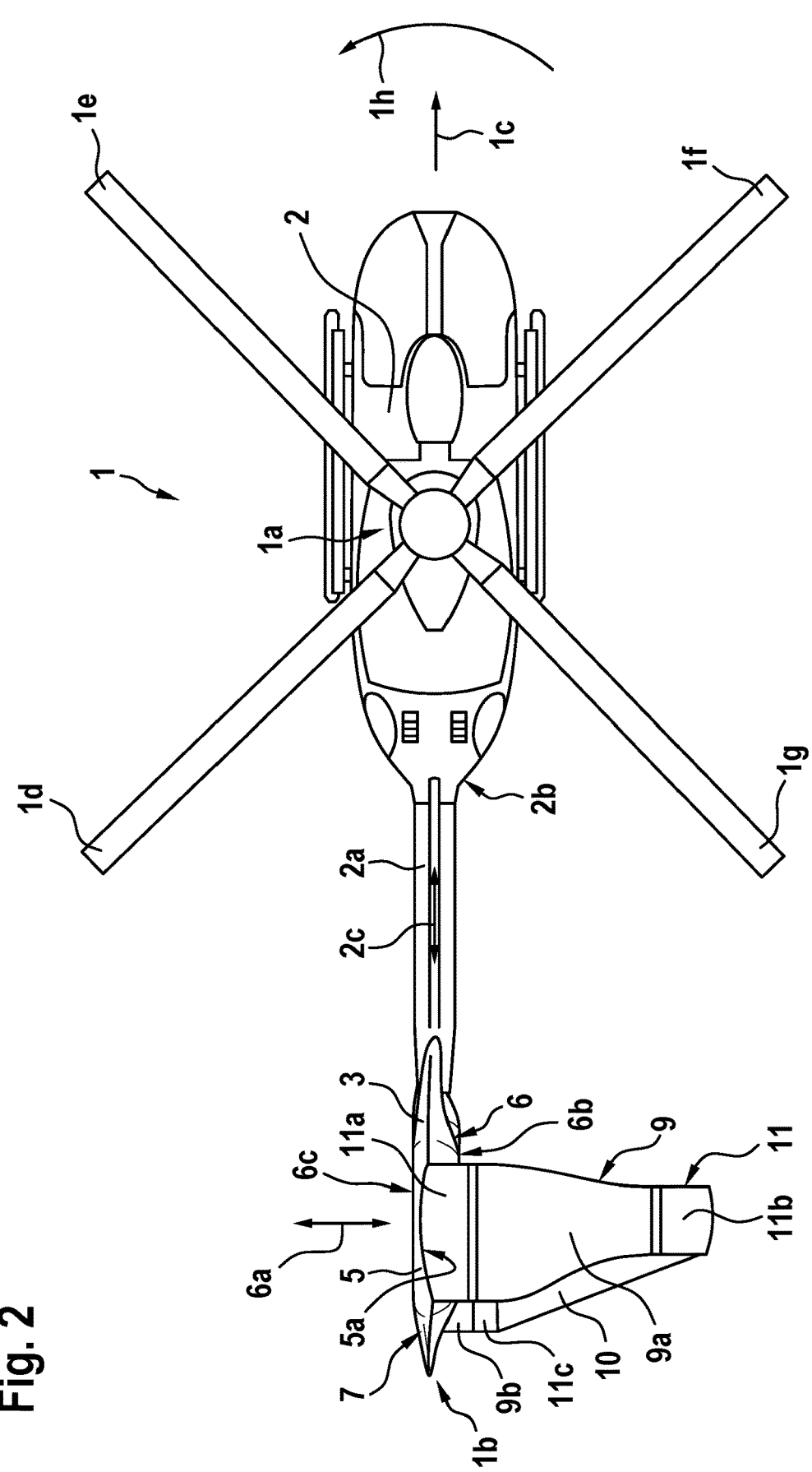
FIG. 2 shows a top view of the rotorcraft of FIG. 1.

FIG. 2 shows the helicopter 1 of FIG. 1 with the at least one main rotor 1a, the fuselage 2, and the tail boom 2a that extends in its longitudinal direction 2c from the rear fuselage 2b toward the duct-type portion 7. Illustratively, the at least one main rotor 1a has a plurality of rotor blades 1d, 1e, 1f, 1g.

Furthermore, as described above at FIG. 1 the duct-type portion 7 comprises the shroud 3 and the integral stabilizer arrangement 5, 9, 10 with the vertical stabilizer 5, the horizontal stabilizers 9 including the upper horizontal stabilizer 9a and the lower horizontal stabilizer 9b, and the profiled connecting strut 10. The integral stabilizer arrangement 5, 9, 10 is embodied in box configuration and arranged laterally on the side of the shroud 3 on which the air inlet region 6b of the transverse duct 6 is arranged.

Illustratively, the transverse duct 6 has a longitudinal extension 6a which is oriented at least essentially perpendicular to the longitudinal direction 2c of the tail boom 2a. The transverse duct 6 extends in direction of this longitudinal extension 6a from the air inlet region 6b to an air outlet region 6c.

By way of example, it is assumed that a right-hand side of the transverse duct 6, seen in the forward flight direction 1c of the helicopter 1, forms the air inlet region 6b. Accordingly, it is further assumed that a left-hand side of the transverse duct 6, seen in the forward flight direction of the helicopter 1, forms the air outlet region. However, it should be noted that the location of the air inlet region 6b and the air outlet region 6c of the transverse duct 6 of the shroud 3 on the helicopter 1 depends on a rotation direction of the at least one main rotor 1a of the helicopter 1. More specifically, in the present example, in which the air inlet region 6b is assumed to be located on the right-hand side of the helicopter 1, i.e., the transverse duct 6, and wherein the air outlet region 6c is assumed to be located on the left-hand side of the helicopter 1, i.e., the transverse duct 6, it is also assumed that the at least one main rotor 1a rotates in counterclockwise direction in the forward flight condition, as indicated with an arrow 1h.

In other words, the air inlet region 6b and the integral stabilizer arrangement 5, 9, 10 are preferably arranged on the same side of the helicopter 1. This is advantageous, as thereby a generated airflow exiting the transverse duct 6 at the air outlet region 6c would not be disturbed by any obstacles, in particular not by the integral stabilizer arrangement 5, 9, 10.

Preferably, the integral stabilizer arrangement 5, 9, 10 with the vertical stabilizer 5, the horizontal stabilizers 9 including the upper horizontal stabilizer 9a and the lower horizontal stabilizer 9b, and the profiled connecting strut 10 further comprises a plurality of rounded connecting portions 11. Illustratively, the upper horizontal stabilizer 9a is mounted to the vertical stabilizer 5 via a first rounded connecting portion 11a of the plurality of rounded connecting portions 11. Likewise, the profiled connecting strut 10 is mounted to the upper horizontal stabilizer 9a via a second rounded connecting portion 11b of the plurality of rounded connecting portions 11. Similarly, the profiled connecting strut 10 is mounted to the lower horizontal stabilizer 9b via a third rounded connecting portion 11c of the plurality of rounded connecting portions 11.

Figure 3:
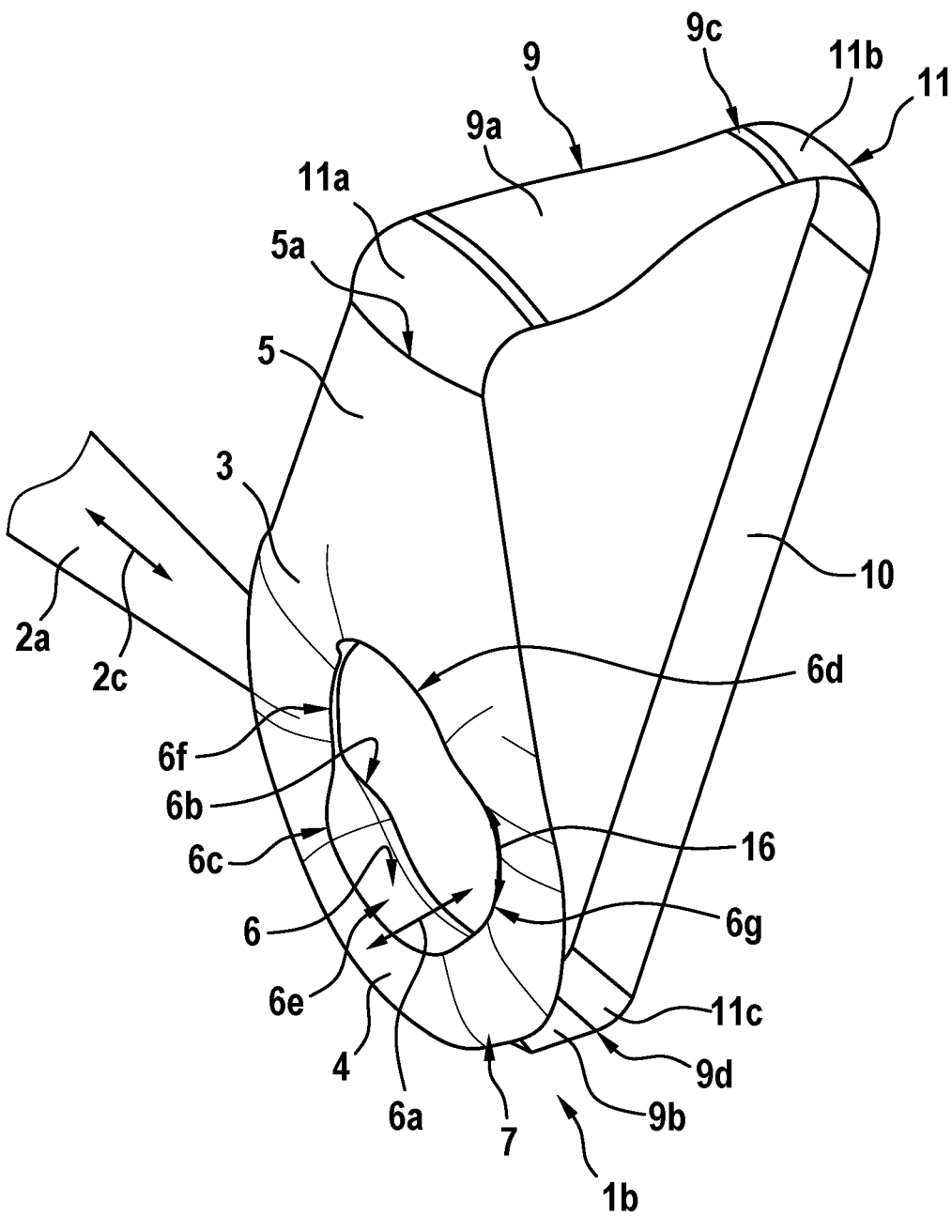
FIG. 3 shows a perspective view of the duct-type tail portion having the shroud with the integral stabilizer arrangement of FIG. 1 and FIG. 2.

FIG. 3 shows a portion of the tail boom 2a extending in the longitudinal direction 2c, as well as the duct-type portion 7 of FIG. 1 and FIG. 2 with the shroud 3 that forms the transverse duct 6 having the air inlet region 6b and the air outlet region 6c. The duct-type portion 7 comprises the integral stabilizer arrangement 5, 9, 10 with the vertical stabilizer 5, the horizontal stabilizers 9 including the upper horizontal stabilizer 9a and the lower horizontal stabilizer 9b, the profiled connecting strut 10, and the plurality of rounded connecting portions 11 including the first, second, and third rounded connecting portions 11a, 11b, 11c.

Preferably, the upper horizontal stabilizer 9a extends farther away from the shroud 3 than the lower horizontal stabilizer 9b on the side of the shroud 3 on which the air inlet region 6b of the transverse duct 6 is arranged. In other words, the upper horizontal stabilizer 9a has preferably a greater longitudinal extension than the lower horizontal stabilizer 9b.

Illustratively, the upper horizontal stabilizer 9a has an outer end 9c that is spaced apart from the vertical stabilizer 5 and connected via the second rounded connecting portion 11b to a first axial end of the profiled connecting strut 10. The lower horizontal stabilizer 9b has an outer end 9d that is spaced apart from the shroud 3 and illustratively connected via the third rounded connecting portion 11c to a second axial end of the profiled connecting strut 10. Preferably, the second rounded connecting portion 11b and the third rounded connecting portion 11c are spaced apart from each other in the longitudinal direction 2c of the tail boom 2a such that the profiled connecting strut 10 is arranged at least approximately tangentially to the transverse duct 6, as further detailed in FIG. 4.

FIG. 3 also further illustrates the air outlet region 6c of the transverse duct 6 having the longitudinal extension 6a according to FIG. 2. The longitudinal extension 6a is oriented at least essentially perpendicular to the circumferential direction 16 and at least essentially perpendicular to the longitudinal direction 2c of the tail boom 2a. The air outlet region 6c is preferably provided in the circumferential direction 16 of the transverse duct 6 at least partly with a sharp corner that may e.g., be implemented by a simple cut edge, a Gurney flap or a covered Gurney flap.

Illustratively, the transverse duct 6 comprises a depth oriented at least essentially in parallel to the longitudinal extension 6a of the transverse duct 6. The depth preferably varies along the circumferential direction 16 of the transverse duct 6. This is illustratively achieved by providing the shroud 3 with broad upper and lower sections 6d, 6e and small front and rear sections 6f, 6g. The front section 6f, the upper section 6d, the rear section 6g, and the lower section 6e are preferably interconnected via aerodynamically shaped transition regions.

More specifically, the front section 6f illustratively connects the shroud 3 to the tail boom 2a. The front section 6f may be embodied along the longitudinal direction 2c of the tail boom 2a as a comparatively small or slim airfoil-like aerodynamic profile with a trailing edge that forms part of the transverse duct 6. The rear section 6g is arranged diametrically opposed to the front section 6f and forms a rear end of the helicopter 1 of FIG. 1 and FIG. 2. This rear section 6g may also be embodied along the longitudinal direction 2c of the tail boom 2a, or it may be inclined by an angle of up to 40° relative to the longitudinal direction 2c, as a comparatively small or slim airfoil-like aerodynamic profile and illustratively comprises a leading edge that forms part of the transverse duct 6. Accordingly, the front section 6f and the rear section 6g, which respectively form a suction area and a compression area of the shroud 3, are tapered compared to conventional shroud designs, thus, significantly reducing drag of the shroud 3.

The upper section 6*d* illustratively connects the shroud 3 to the vertical stabilizer 5, and the lower section 6*e* which is arranged diametrically opposed to the upper section 6*d* illustratively connects the shroud 3 to the bumper 4. Along the longitudinal direction 2*c* of the tail boom 2*a*, the upper and lower sections 6*d*, 6*e* may respectively be embodied as airfoil-like aerodynamic profiles. The upper and lower sections 6*d*, 6*e* respectively interconnect the front and rear sections 6*f*, 6*g* and may each comprise a large plain area with a large depth along the longitudinal extension 6*a* of the transverse duct 6*a*. Preferably, the upper section 6*d* forms a maximum depth surface of the transverse duct 6 and the lower section 6*e* similarly forms a maximum depth surface of the transverse duct 6.

Figure 4:
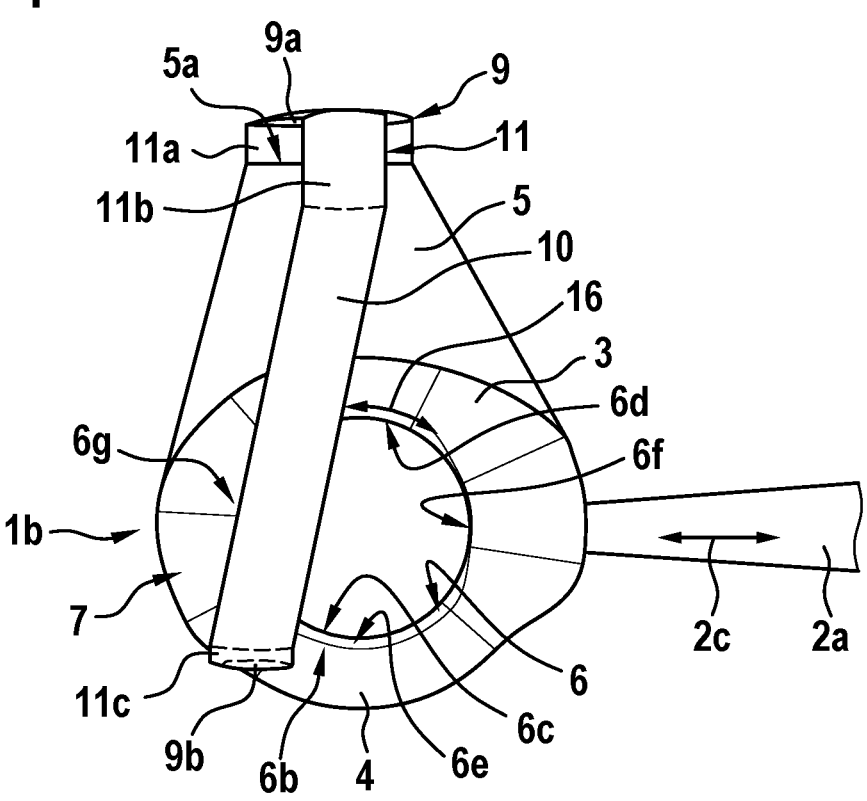
FIG. 4 shows a side view of the duct-type tail portion having the shroud with the integral stabilizer arrangement of FIG. 1 to FIG. 3.

FIG. 4 shows a portion of the tail boom 2*a* extending in the longitudinal direction 2*c*, as well as the duct-type portion 7 of FIG. 1 to FIG. 3 with the shroud 3 that forms the transverse duct 6 having the air inlet region 6*b* and the air outlet region 6*c*. The duct-type portion 7 comprises the integral stabilizer arrangement 5, 9, 10 with the vertical stabilizer 5, the horizontal stabilizers 9 including the upper horizontal stabilizer 9*a* and the lower horizontal stabilizer 9*b*, the profiled connecting strut 10, and the plurality of rounded connecting portions 11 including the first, second, and third rounded connecting portions 11*a*, 11*b*, 11*c*. The upper horizontal stabilizer 9*a* is connected via the rounded connecting portion 11*b* to the profiled connecting strut 10 and the lower horizontal stabilizer 9*b* is connected via the rounded connecting portion 11*c* to the profiled connecting strut 10.

FIG. 4 further illustrates the at least approximatively tangential arrangement of the profiled connecting strut 10 relative to the transverse duct 6. This tangential arrangement is illustratively obtained by spacing apart the rounded connecting portion 11*b* and the rounded connecting portion 11*c* from each other in the longitudinal direction 2*c* of the tail boom 2*a*. In other words, seen along the longitudinal direction 2*c* of the tail boom 2*a*, the rounded connecting portion 11*b* is positioned closer to the tail boom 2*a* than the rounded connecting portion 11*c*.

Figure 5:
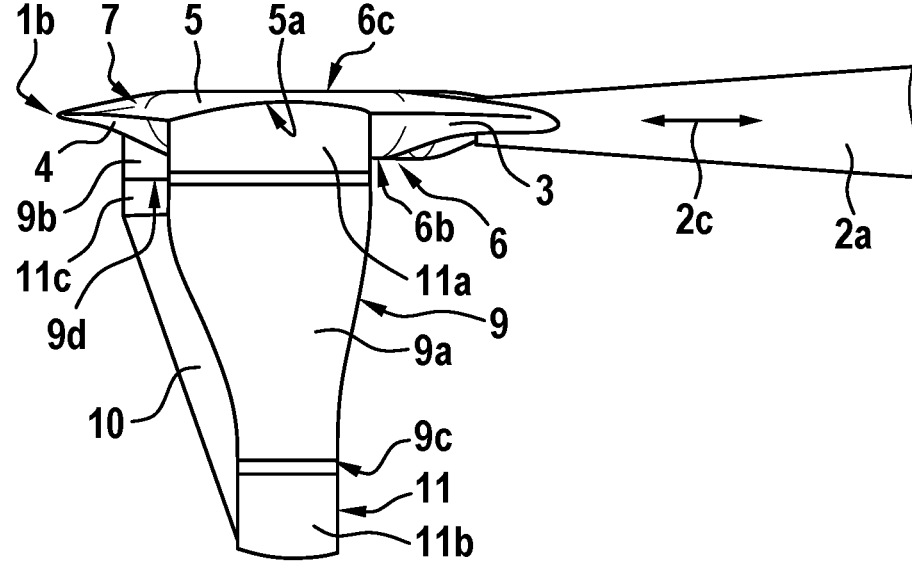
FIG. 5 shows a top view of the duct-type tail portion having the shroud with the integral stabilizer arrangement of FIG. 1 to FIG. 4.

FIG. 5 shows a portion of the tail boom 2*a* extending in the longitudinal direction 2*c*, as well as the duct-type portion 7 of FIG. 1 to FIG. 4 with the shroud 3 that forms the transverse duct 6 having the air inlet region 6*b* and the air outlet region 6*c*. The duct-type portion 7 comprises the integral stabilizer arrangement 5, 9, 10 with the vertical stabilizer 5, the horizontal stabilizers 9 including the upper horizontal stabilizer 9*a* and the lower horizontal stabilizer 9*b*, the profiled connecting strut 10, and the plurality of rounded connecting portions 11 including the first, second, and third rounded connecting portions 11*a*, 11*b*, 11*c*. The upper horizontal stabilizer 9*a* is connected via the rounded connecting portion 11*a* to the vertical stabilizer 5 and via the rounded connecting portion 11*b* to the profiled connecting strut 10, and the lower horizontal stabilizer 9*b* is connected via the rounded connecting portion 11*c* to the profiled connecting strut 10.

FIG. 5 further illustrates an illustrative realization of the integral stabilizer arrangement 5, 9, 10. More specifically, in longitudinal direction of the horizontal stabilizers 9, the lower horizontal stabilizer 9*b* and the rounded connecting portion 11*a* have preferably at least approximately the same length. Accordingly, the lower horizontal stabilizer 9*b* is connected to the profiled connecting strut 10 comparatively close to the shroud 3. The upper horizontal stabilizer 9*a*, however, has a comparatively great length in the longitudinal direction of the horizontal stabilizers 9, such that the profiled connecting strut 10 is inclined relative to a height axis of the shroud. Accordingly, the integral stabilizer arrangement 5, 9, 10 forms an approximatively triangular structure, as further detailed in FIG. 6.

Figure 6:
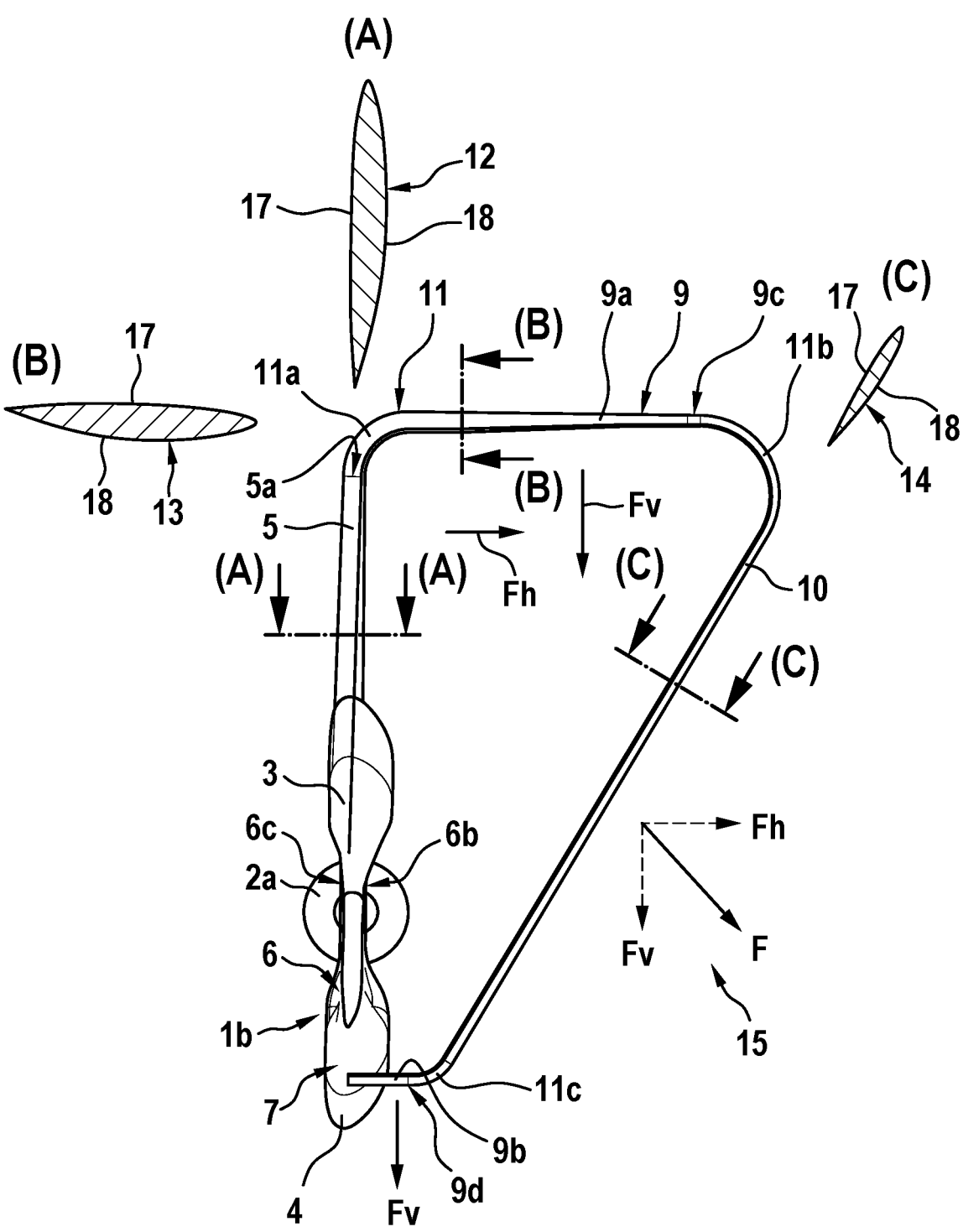
FIG. 6 shows a rear view of the duct-type tail portion having the shroud with the integral stabilizer arrangement of FIG. 1 to FIG. 5.

FIG. 6 shows the duct-type portion 7 of FIG. 1 to FIG. 5 with the shroud 3, the bumper 4, and the integral stabilizer arrangement 5, 9, 10 which forms an at least approximatively triangular structure. The shroud 3 forms the transverse duct 6 having the air inlet region 6*b* and the air outlet region 6*c*. The integral stabilizer arrangement 5, 9, 10 comprises the vertical stabilizer 5, the horizontal stabilizers 9 including the upper horizontal stabilizer 9*a* and the lower horizontal stabilizer 9*b*, the profiled connecting strut 10, and the plurality of rounded connecting portions 11 including the first, second, and third rounded connecting portions 11*a*, 11*b*, 11*c*. The vertical stabilizer 5 is connected via the rounded connecting portion 11*a* to the upper horizontal stabilizer 9*a*. The upper horizontal stabilizer 9*a* extends from the rounded connecting portion 11*a* toward its outer end 9*c* and is connected at its outer end 9*c* via the rounded connecting portion 11*b* to the profiled connecting strut 10. The profiled connecting strut 10 is further connected to the outer end 9*d* of the lower horizontal stabilizer 9*b* via the rounded connecting portion 11*c*. The lower horizontal stabilizer 9*b* extends from its outer end 9*d* toward the shroud 3 and is connected to the latter.

FIG. 6 further illustrates a resulting force diagram 15 of a stabilizing force F generated by means of the profiled connecting strut 10. The stabilizing force F is illustratively composed of a horizontal force Fh that supports the vertical stabilizer 5, and vertical forces Fv which support the upper horizontal stabilizer 9*a* and the lower horizontal stabilizer 9*b*.

Preferably, the vertical stabilizer 5 and at least the upper horizontal stabilizer 9*a* are formed as aerodynamic profiles, in particular airfoil-like aerodynamic profiles. By way of example, the vertical stabilizer 5 comprises an aerodynamic profile 12 and the upper horizontal stabilizer 9*a* comprises an aerodynamic profile 13. Likewise, the profiled connecting strut 10 may comprise an aerodynamic profile 14.

Illustratively, the aerodynamic profiles 12, 13, 14 are shown with at least approximatively straight profile bases 17 and opposed curved profile sides 18. However, it should be noted that other profile shapes are likewise contemplated.

It should further be noted that the above described preferred embodiments are merely described to illustrate possible embodiments of the present disclosure, but not in order to restrict the present disclosure thereto. Instead, multiple modifications and variations of the disclosure are possible and should, therefore, also be considered as being part of the disclosure.

For instance, although the aerodynamic profiles 12, 13, 14 in FIG. 6 are shown with the at least approximatively straight profile bases 17, they may comprise significantly stronger pronounced curvatures. For instance, the at least approximatively straight profile bases 17 may be curved similar to the curved profile sides 18 of the aerodynamic profiles 12, 13, 14 such that e.g., respective profile chords are located outside of the aerodynamic profiles 12, 13, 14. Furthermore, e.g., a respective trailing edge of the aerodynamic profile 12 may be inclined upside, i.e., be positioned higher than a respective leading edge of the aerodynamic profile 12 to increase an associated lift coefficient of the aerodynamic profile 12. Thus, a respective torque coefficient at the neutral point of the aerodynamic profile 12 may likewise be increased.

REFERENCE LIST

1 rotorcraft
1*a* main rotor
1*b* rotorcraft aft section
1*c* rotorcraft forward flight direction
1*d*, 1*e*, 1*f*, 1*g* main rotor blades
1*h* main rotor rotation direction
2 fuselage
2*a* tail boom
2*b* rear fuselage
2*c* tail boom longitudinal direction
3 shroud
4 bumper
5 vertical stabilizer
5*a* upper end of vertical stabilizer
6 transverse duct
6*a* duct longitudinal extension
6*b* air inlet region
6*c* air outlet region
6*d* broad upper section
6*e* broad lower section
6*f* small front section
6*g* small rear section
7 duct-type tail portion
8 counter-torque device
8*a* counter-torque rotor
9 horizontal stabilizers
9*a* upper horizontal stabilizer
9*b* lower horizontal stabilizer
9*c* upper horizontal stabilizer outer end
9*d* lower horizontal stabilizer outer end
10 profiled connecting strut
11 rounded connecting portions
11*a*, 11*b*, 11*c* connecting portions
12 vertical stabilizer aerodynamic profile
13 upper horizontal stabilizer aerodynamic profile
14 profiled connecting strut aerodynamic profile
15 resulting force diagram
16 circumferential direction
17 profile basis
18 profile side

What is claimed is:

1. A rotorcraft with at least one main rotor and a fuselage, comprising:
a tail boom connected to the fuselage, the tail boom extending in a longitudinal direction from the fuselage;
a shroud rigidly secured to the tail boom and forming a transverse duct forming an air inlet region and an air outlet region, the transverse duct comprising a circumferential direction and a longitudinal extension oriented at least essentially perpendicular to the circumferential direction and at least essentially perpendicular to the longitudinal direction of the tail boom;
at least one ducted tail rotor positioned to rotate in the transverse duct; and
an integral stabilizer arrangement formed integrally with the shroud, the integral stabilizer arrangement having a box configuration extending laterally from a side of the shroud on which the air inlet region of the transverse duct is arranged.

2. The rotorcraft of claim 1,
wherein the integral stabilizer arrangement comprises a vertical stabilizer integrally formed with the shroud and having a first aerodynamic profile for providing at least stability of the rotorcraft in yaw.

3. The rotorcraft of claim 2,
wherein the integral stabilizer arrangement comprises at least one horizontal stabilizer mounted to the vertical stabilizer and having a second aerodynamic profile for providing at least stability of the rotorcraft in pitch, the at least one horizontal stabilizer extending from the vertical stabilizer on the side of the shroud on which the air inlet region of the transverse duct is arranged.

4. The rotorcraft of claim 3,
wherein the at least one horizontal stabilizer comprises an upper horizonal stabilizer and a lower horizonal stabilizer, wherein the upper horizontal stabilizer is mounted to the vertical stabilizer, wherein lower horizontal stabilizer is positioned more aft than the upper horizontal stabilizer.

5. The rotorcraft of claim 3,
wherein the integral stabilizer arrangement comprises a profiled connecting strut connecting the horizontal stabilizer to the shroud, the profiled connecting strut spaced apart from the shroud by the horizonal stabilizer on the side of the shroud on which the air inlet region of the transverse duct is arranged.

6. The rotorcraft of claim 5,
wherein the profiled connecting strut extends at an angle generally tangential to the transverse duct.

7. The rotorcraft of claim 2,
wherein the vertical stabilizer extends above the duct and forms a tail fin.

8. The rotorcraft of claim 1,
wherein the integral stabilizer arrangement is positioned behind the central axis of the duct to avoid blockage of airflow.

9. The rotorcraft of claim 1,
wherein the transverse duct comprises a depth oriented at least essentially parallel to the longitudinal extension of the transverse duct, and wherein the depth varies along the circumferential direction of the transverse duct.

10. A rotorcraft with at least one main rotor and a fuselage, comprising:
a tail boom extending rearwardly in a longitudinal direction from the fuselage;
a shroud forming a duct mounted to a rear end of the tail boom, the duct extending transverse to the longitudinal direction with an air inlet on a first lateral side and an air outlet on a second lateral side;
a counter-torque tail rotor rotatably arranged in the duct; and
a one-sided stabilizer extending laterally from one of the first lateral side or second lateral side of the shroud, the one-sided stabilizer comprising:
a vertical stabilizer segment integrally formed with the shroud,
at least one horizontal stabilizer segment extending from the shroud, and
a connecting strut connected to the at least one horizonal segment to form an open box configuration.

11. The rotorcraft of claim 10, wherein the vertical stabilizer segment extends in a vertical direction being generally perpendicular to the longitudinal direction and has an aerodynamic profile which provides stability to the rotorcraft in yaw.

12. The rotorcraft of claim 10, wherein the at least one horizontal stabilizer segment comprises an upper horizonal stabilizer segment and a lower horizonal stabilizer segment extending in a transverse direction essentially perpendicular to the longitudinal direction and provide stability to the rotorcraft in pitch, the upper and lower horizontal stabilizer segments extending from the vertical stabilizer segment on the first side of the shroud adjacent the air inlet, wherein the lower horizontal stabilizer segment is positioned more aft than the upper horizontal stabilizer segment.

13. The rotorcraft of claim 12, wherein the upper horizontal stabilizer segment is longer than the lower horizontal stabilizer stabilizer, wherein the connecting strut extends between the upper horizonal stabilizer segment and the lower horizontal stabilizer segment.

14. The rotorcraft of claim 12, wherein the connecting strut extends between the upper and lower horizontal segments at an angle approximately tangentially to the transverse duct.

15. The rotorcraft of claim 10, wherein the at least one horizontal segment comprises a first horizonal segment and second horizonal segment, wherein the connecting strut extends between the first and second horizontal segments and is positioned behind the central axis of the duct to avoid blockage of airflow.

16. The rotorcraft of claim 10, wherein a transverse depth from the air inlet to the air outlet varies along the circumference of the transverse duct.

17. A rotorcraft with at least one main rotor and a fuselage, comprising:

a tail boom extending rearwardly in a longitudinal direction from the fuselage;

a shroud forming a duct mounted to a rear end of the tail boom, the duct extending transverse to the longitudinal direction with an air inlet on a first lateral side and an air outlet on a second lateral side;

a counter-torque tail rotor rotatably arranged in the duct; and a one-sided stabilizer integrally formed with the shroud extending laterally from only the first lateral side adjacent the air inlet, the one-sided stabilizer having at least three stabilizer segments that form an open box configuration, wherein the at least three stabilizer segments each have an aerodynamic profile and are positioned behind the central axis of the duct to avoid blockage of airflow.

18. The rotorcraft of claim 17, wherein the at least three stabilizer segments comprise a vertical stabilizer segment connected to at least one horizontal segment, and a connecting strut connected to the at least one horizonal segment to form an open box configuration, wherein the vertical stabilizer segment extends in a vertical direction being generally perpendicular to the longitudinal direction and provides stability to the rotorcraft in yaw.

19. The rotorcraft of claim 18, wherein the at least one horizontal segment comprises a first horizonal segment and a second horizonal segment extending in a transverse direction essentially perpendicular to the longitudinal direction and provide stability to the rotorcraft in pitch, the first and second horizontal segments extending from the vertical segment on the first side of the shroud adjacent the air inlet.

20. The rotorcraft of claim 18, wherein the connecting strut extends between the first and second horizontal segments at an angle approximately tangentially to the transverse duct.

* * * * *